United States Patent
Wheat et al.

(10) Patent No.: US 6,585,805 B1
(45) Date of Patent: Jul. 1, 2003

(54) GAS STREAM APPARATUS AND METHOD

(75) Inventors: William S. Wheat, Rochester, NY (US); Ronald J. Daum, Bloomfield, NY (US); James W. Dandalides, Webster, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/015,719

(22) Filed: Dec. 13, 2001

(51) Int. Cl.$^7$ .............................................. B01D 53/06
(52) U.S. Cl. ............................... 95/113; 96/125; 55/502
(58) Field of Search ............................. 95/113; 96/124, 96/125, 152, 400; 55/502

(56) References Cited

U.S. PATENT DOCUMENTS

| | | | | |
|---|---|---|---|---|
| 2,507,607 A | * | 5/1950 | Miller ........................... | 96/125 |
| 4,062,129 A | * | 12/1977 | Yoshida et al. ................. | 165/8 |
| 4,402,717 A | * | 9/1983 | Izumo et al. ................... | 96/118 |
| 4,452,612 A | * | 6/1984 | Mattia ........................... | 95/100 |
| 4,863,497 A | * | 9/1989 | Grenier et al. ................. | 96/123 |
| 5,238,052 A | * | 8/1993 | Chagnot ......................... | 165/54 |
| 5,733,451 A | * | 3/1998 | Coellner et al. ............ | 210/496 |
| 6,004,384 A | * | 12/1999 | Caudle .......................... | 55/502 |
| 6,013,385 A | | 1/2000 | DuBose ......................... | 429/17 |
| 6,447,583 B1 | * | 9/2002 | Thelen et al. .................. | 95/113 |

OTHER PUBLICATIONS

Sybil P. Parker, *McGraw–Hill Dictionary of Scientific and Technical Terms*, Fifth Edition, 1994, p. 434.

* cited by examiner

Primary Examiner—David A. Simmons
Assistant Examiner—Frank M. Lawrence
(74) Attorney, Agent, or Firm—Cary W. Brooks

(57) ABSTRACT

Described is a method of conditioning a gas stream comprising passing the gas stream into a vessel 10 which contains a rotating enclosure 12 and which contains an apparatus 18 to rotate the enclosure, which enclosure is pressure sealed from the surrounding atmosphere and which is divided into a plurality of modulating zones 14, 16; treating the gas to modify its properties within the enclosures due to the presence of modulating materials 68 within the zones in the enclosure; and passing the modified gas to an outlet 24, 25 of the vessel. Also described is an apparatus for conditioning a plurality of gas streams.

10 Claims, 2 Drawing Sheets

GAS STREAM APPARATUS AND METHOD

TECHNICAL FIELD

The present invention pertains to an apparatus for treating a plurality of gas streams in an apparatus and to modify the gas streams and process for such modification.

BACKGROUND OF THE INVENTION

Gas flow management systems have been available for increasing the humidity in a gas stream. The control of their flow has been utilized in the pharmaceutical, food, or chemical industries. Control of humidity is particularly important to prevent rust or condensation for plant equipment, cargo ships and precision electronic parts. In addition, having control of the air streams is desired for certain crops dryness, such as, tea leaves, dried sea leaves, lumbers, mushrooms, fishes and other materials where there is a need for low humid storage. Fuel cell gas management systems are also areas for the modification of gas streams for decreased humidity. See U.S. Pat. No. 6,013,385.

The difficulties associated with previous air flow systems is that substantial mechanical action may be required to drive a rotating air flow chamber utilizing frictional forces widely separated from the rotating wheel. The idea of exchanging water vapor using a rotating desiccant substrate is widely used in the HVAC industries for commercial and residential applications. However, the problems associated with utilizing this technology for gas management in fuel cell systems is due to high differential pressures between the gas flow inside a fuel cell system and the atmosphere. Such high differential pressures can require substantial mechanical action to drive a rotating air flow chamber. The air flow chamber must be compressed, creating large frictional forces on rotating parts, to eliminate leakage of gases due to the large differential pressures.

Problems associated with gas flows are that the pressure differential between the atmosphere and the gas stream is quite high. It would be desirable to decrease the gas pressure within a rotating vessel thereby decreasing the size of a motor to drive a humidity control vessel.

SUMMARY OF THE INVENTION

Described is a method of conditioning a gas stream comprising passing the gas stream into a vessel which contains a rotating enclosure and which contains an apparatus to rotate the enclosure, which enclosure is pressure sealed from the surrounding atmosphere and which is divided into a plurality of modulating zones; and treating the inlet gas to modify its properties within the enclosure due to the presence of modulating materials within the zones in the enclosure; and passing the modified gas to an outlet of the vessel.

Also described is an apparatus for conditioning a plurality of gas streams comprising a vessel which contains an enclosure capable of rotating, which enclosure is pressure sealed from the surround atmosphere, by a second, outer enclosure, and is divided into a plurality of modulating zones; the zones having the ability to modify the properties of the gas streams coming in contact with the zones due to the presence of modulating materials therein; a motor within the vessel capable of rotating the enclosure within the vessel to facilitate the contacting of the gas streams within the zones and preferably a plurality of inlets to the vessel for the gas streams and a preferably plurality of outlets from the vessel to pass the modulated gas streams whereby the gas streams pass through the inlets to the vessel and then to the enclosures and are modified in the zones, as the enclosure is rotated, and exit from the enclosure zones in a modified form and then exit from the vessel.

DESCRIPTION OF THE PREFERRED EMBODIMENT

Figure 1:
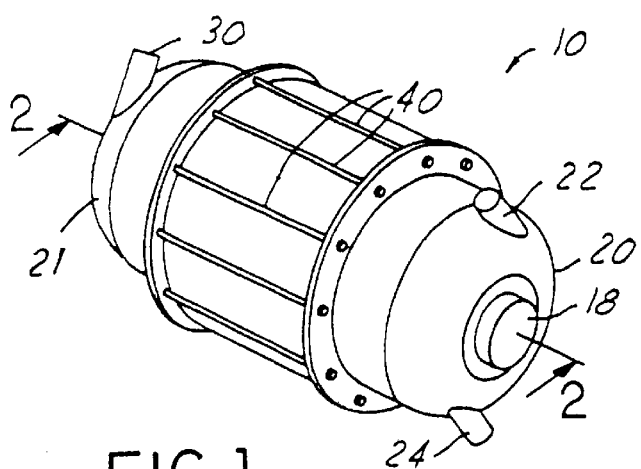
FIG. 1 is a perspective view of the gas stream treatment apparatus of the present invention.

By "conditioning" is meant subjecting a material to a treatment or stimulus so that it will respond in a uniform and desired manner to subsequent processing (McGraw-Hill Dictionary of Scientific and Technical Terms $5^{th}$ ed. By Parker 1994: p. 434).

By "modulating" is meant the process of passing gradually from one condition to another namely by adjusting the properties of the gas stream from one condition to another.

The present invention is directed towards a shell that is capped on each side with a flow chamber cap that is separated in halves by an internal end cap partition. The end caps, containing the flow inlets and outlets, are held against the outer enclosure and the inner rotating enclosure using compression rods that are separated from the vessel by a seal that is mounted statically to the end caps and rides firmly compressed against the inner rotating enclosure. In the prior art the entire vessel would rotate via a friction belt wrapped around the outside of the shell and driven by a motor and pulley mechanism. Such a design exerted force on the rotating ring seal namely the compression rods which need to be large enough to prevent any leakage o the gas streams to the atmosphere. The compression force must be large enough to overcome the differential pressure between the internal gasses and the atmosphere, preventing any leakage o the internal gasses to the atmosphere. This pressure difference can be up to 3 bar. This compression causes a large friction between the rotating enclosure and the end caps, resulting in a higher torque requirement for the motor responsible for the enclosure rotation. This leads to a larger motor driving the enclosure with a belt and pulley. Also due to the nature of this design, the inner portion of the stationary face seal that is mounted to the end cap partition experiences the same compression forces as those required to prevent leakage between the end cap and ring seal. This results in unnecessary friction and compression on a seal that must only be capable of isolating two gas streams. The rotating face seal must only be capable of isolating a differential pressure of up to 0.5 Bar. This unnecessary friction results in an even larger torque requirement for the driving motor.

The design of the present invention as shown in the drawings integrates the driving motor and the enclosure into one package substantially within the vessel. The invention utilizes sealing deliberately to reduce the required friction and thus the drive motor size. This invention utilizes an outer enclosure which is compressed between two flow chamber caps. This design has an additional enclosure inside the outer enclosure that houses the modulating materials. This internal enclosure with the modulating materials rotates inside the outer enclosure. Having two shells allows for the large compression forces required to overcome leakage of the gas streams to the atmosphere to be applied only to the stationary outer enclosure. The inner, rotating enclosure must now only be compressed to overcome the pressure drop through the modulating material of that vessel, a value commonly 10 times less than the pressure difference between the gasses and the atmosphere. This results in approximately 10 times less torque to drive the rotation of the rotating enclosure shell. Changing the differences in lengths between the rotating enclosure shell and the vessel can vary the amount of compression placed on the rotating enclosure shell. The reduced compression and thus torque, results in a smaller motor size. This preferably can be integrated into the vessel. This therefore results in fewer parts and more compact package.

Figure 1A:
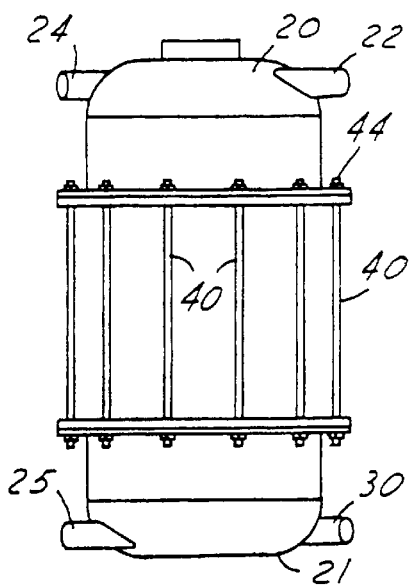
FIG. 1A is a side view of the gas stream treatment apparatus of FIG. 1.

FIGS. 1–1A show the unit 10 for modulating a plurality of gas streams, preferably two gas streams. The unit contains a rotating enclosure 12 which is sealed from the surrounding atmosphere 10 outside by the outer enclosure 46. The rotating enclosure is partitioned into two zones 14 and 16. The zones have the ability to modify the properties of the gas streams coming in contact with them due to the presence of modulating material substrate 68, preferably the same material, just placed in different zones. A motor 18 is substantially retained with the vessel 10 and in particular in the top end cap 20. The motor can rotate the internal enclosure 12 within the outer enclosure 46 to facilitate the contacting of the gas streams within the zones. There are a plurality of inlets 22 and 30 as well as a plurality of outlets 24 and 25. Basically, the gas streams pass through the inlets 22 and 30 (cross flow) into the partitioned chambers 16 and 14 and then modified in the zones 105 and 106 as it is rotated. The treated gas then exits the enclosure zones through outlets 24 and 25.

Figure 2:
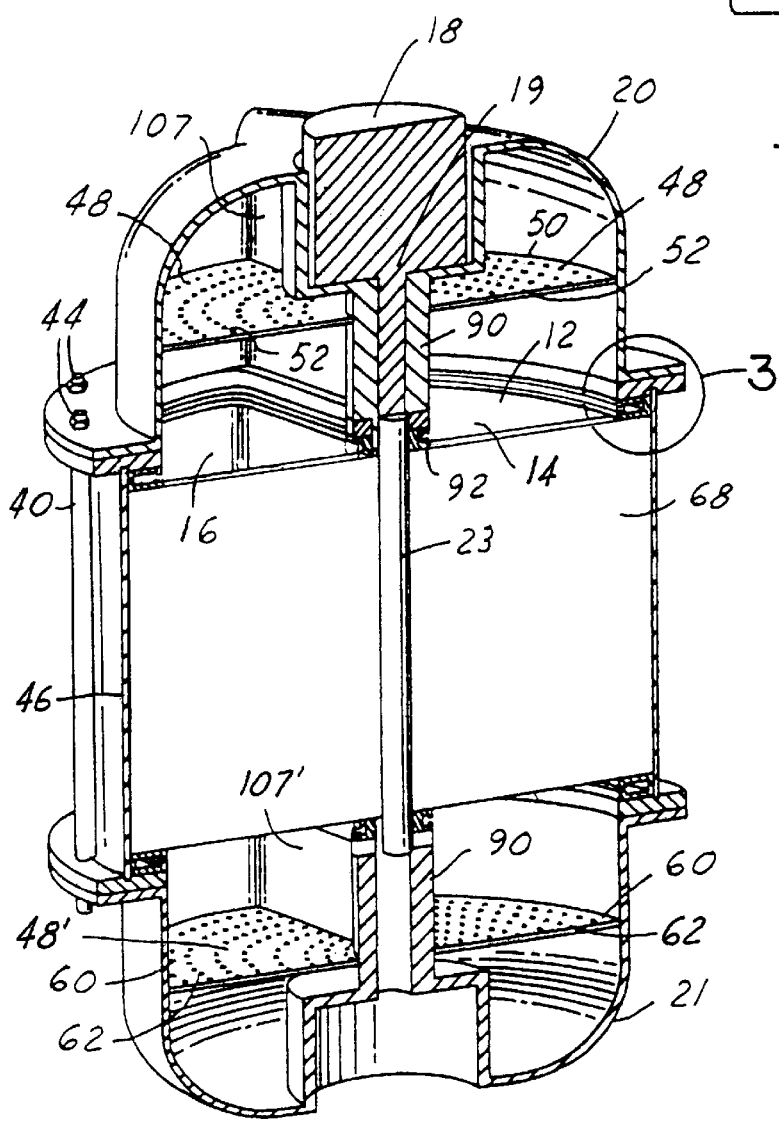
FIG. 2 is a sectional view taken along lines 2—2 of FIG. 1.
Figure 3:
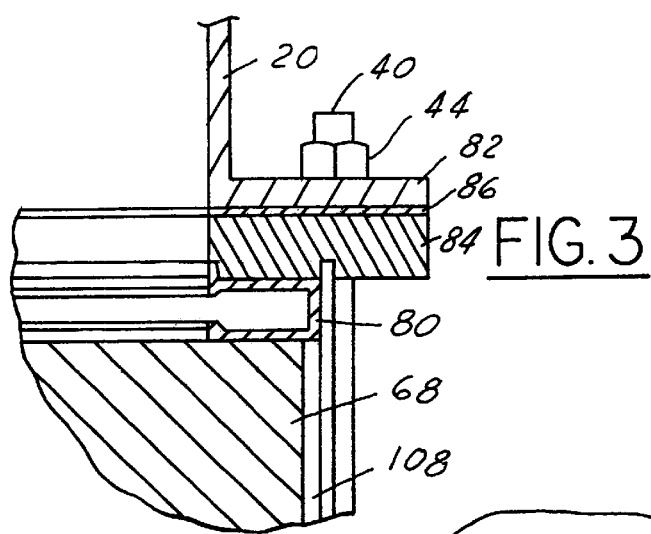
FIG. 3 is an exploded view of the interconnections between the gas treatment vessel of the present invention and the rotating face seal utilized in the vessel of the present invention.

The end caps 20 and 21 are secured together by compression rods 40 which are held together by locking mechanisms 44. As can be seen in FIG. 2, the overall unit is comprised of tops 20 and 21 and the outer enclosure 46. The gas stream enters into the inlets 22 and 30 and is distributed through the respective zones 16 and 14 by diffusers 48 and 48'. Each diffuser 48 and 48' is comprised of a metal plate 50 and 60 and perforated with holes 52 and 62 respectively. The gas streams entering the inlets 22 and 30 are separated by inlet chamber divider plates 107 and 107'. The gasses remain separated by the substrate 68 filling the inner vessel shell 108. This divides the inner enclosure 12 into modulating zones 14 and 16. Due to the nature of the fixed end caps and rotating inner enclosure, there is a need to seal the gasses from the environment which is achieved by the outer ring seal 80 best shown in FIG. 3. The lip 82 of cap 20 is secured to side sealing member 84 of the outer enclosure 46 by a gasket 86 which is the flange of the mounting seal.

The motor 18 is attached to a shaft 19 which engages shaft extension 23 to which the rotating enclosure 12 is snuggly attached.

Figure 4:
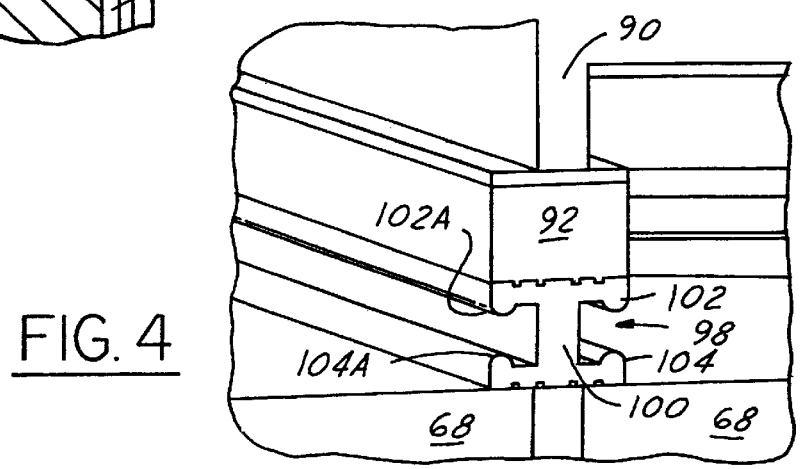
FIG. 4 is an exploded view of the rotating face seal utilized in the vessel of the present invention. This seal is responsible for preventing cross over leakage of the two gas streams on each side of the partition.
Figure 6:
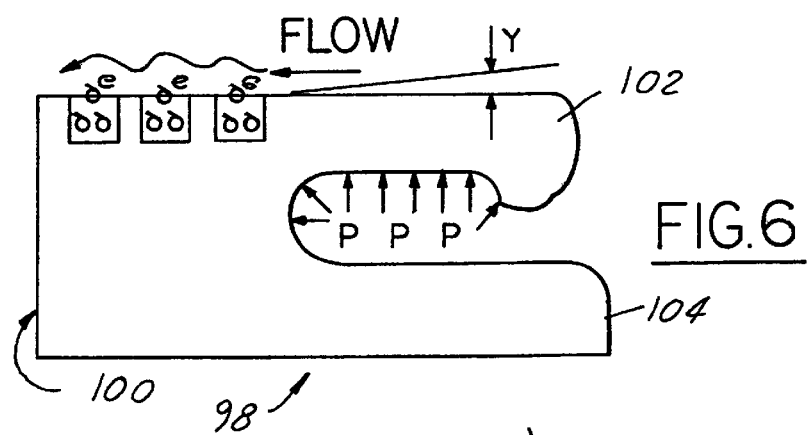
FIG. 6 is an exploded view of the labyrinth type face seal which provides eddies which prevent flow across the seal, again preventing cross over leakage of the two gas streams on each side of the partition. This figure is an exploded view of a portion of FIG. 5. This figure is a simple version of the assembly shown in FIG. 4.
Figure 5:
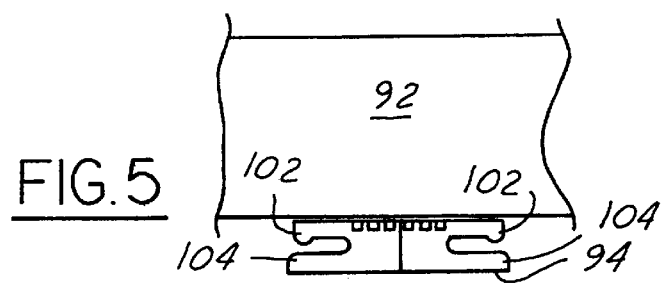
FIG. 5 is an exploded view of the labyrinth typeface seal utilized in the present invention. This figure is a simple version of the assembly shown in FIG. 4.

FIGS. 4, 5 and 6 describe the seal surrounding the shaft extension 23 and allow for a rotating inner enclosure to rotate while maintaining the separation of the two modulating zones 14 and 16. A bushing 90 surrounds the shaft 19 from the motor 18 and is centered in the flow chamber separation plates 107 and 107'. The face seal mount 92 is positioned below the flow chamber cap separation plate to which a face seal 100 is attached as shown schematically in FIG. 4. The actual seal is shown in detail in FIGS. 5 and 6. The sealing member is comprised of a block portion 100 and a plurality of U-shaped extensions 102 and 104. As used in the current invention, a pair of sealing members 98 are used to seal the two modulating zones 14 and 16 from each other and the environment. The two U-shaped extensions 102 and 104 are joined by member 100 in FIG. 5 to another duplicate U-shaped extension 102a and 104a to form a complete H-shaped face seal 100 as seen in FIG. 4. The complete H-shaped face seal 100 is bonded to the fixed face seal mount 92 across from 102a to 102. The other pair of the H-shaped face seal 104 and 104a rests firmly against the substrate 68.

The flow of the gas stream through the enclosures 14 and 16 and corresponding through the substrate 68 will cause a pressure P as shown in FIG. 6 to be applied to the two sides of the H-seal.

FIG. 6 describes the nature of the pressure P on each side of the H-seal. Pressure acts on the seal 100. If flow is to pass by the seal between the substrate and the seal over portion 102 of the U-shape this will cause a lower pressure zone on the top portion of seal extension 102. The pressure on the inside of the seal 102 represented by the P in FIG. 6 will force the seal 102 to deflect moving against the lower pressure zone on the top side of 102 causing the seal to naturally push itself tighter against the substrate, thus sealing off any cross flow. Another method for preventing cross flow can be seen in FIG. 6, represented by "e" and swirls in the channels cut out of 102. The channels will cause eddy currents that will in turn induce turbulence and decrease any laminar cross flow over the H-shaped face seal.

This design reduces the compression forces acting on the substrate to reduce cross flow. Reduced compression forces result in less torque required to turn the enclosure and thus a smaller motor load.

The distinct advantages of the present development results in better flow distribution, using diffusers, resulting in higher utilization of the modulating material substrate and a reduced volume for the enclosures. A better face seal around the bushing 90 and the flow chamber separation plates 107 and 107' by using the labyrinth seals and the improved lip 102, 102a and 104, 104a results in less crossover leakage and smaller motor loads. Side inlet flows resulting in circular flow inside the end caps 20 and 21 provide an opportunity to incorporate water droplet separation for subsequent designs.

The new enclosure shell and assembly reduces the compression forces on the modulating material enclosure shell and thus small motor loads.

Smaller motor loads permit for motor size reduction and incorporation into the overall design and reduce the packaging volume and size of the device. The aforementioned design correspondingly is capable of working for higher pressure applications; capable of handling high differential pressures; reduces substrate size for the modulating materials to permit better flow distribution; has a potential for incorporating water droplet separation resulting in fewer assembly and components parts. The design of the present application permits it to be utilized in the pharmaceutical, chemical, fertilizer and food processing industries which have a requirement of level of the product and enhance production efficiency. In addition to protect turbines of power plants and cargo transported by ships from rusting, it is desired to decrease the moisture content of such environments. Decreased moisture environment is likewise desirable to keep the quality of electronic parts and to control the moisture in exposing films during storage time. Likewise with respect to keeping crops dry such as leaves, seaweed, lumber, mushrooms and fish in low humid storage is likewise obtainable in the present case.

In a fuel cell environment, moisture is controlled from the ambient air as it is led to the electrode stack. In addition, the moisture from the stack is controlled prior to it being exhausted into the atmosphere. In these circumstances, it is desirable to maintain the appropriate humidity for good catalyst operation.

An alternative to the seal around the shaft extension 23 as shown in FIGS. 4–6, is to replace the shaft extension and have the shaft 19 rotate the enclosure 12. The shaft 19 may be glued to the separation plate 107' or may be secured thereto by a tongue and groove relationship (not shown) or other well-known mechanisms to secure a shaft to a metal channel.

The modulating materials may take many types, forms or shapes depending on the environment. If a desiccant is desired, well-known and commercially available zeolites may be used. The rotating enclosure may be divided into 4 components comprised of a honeycomb channel of fiberglass with zeolites retained therein. The desiccant can be prepared in any well-known fashion.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A method of conditioning a gas stream by decreasing humidity therein comprising passing the gas stream into a vessel which vessel contains a rotating enclosure and which contains a motor to rotate the enclosure, which enclosure is pressure sealed from the surrounding atmosphere and which is divided into a plurality of modulating zones; treating the gas to modify its properties within the enclosures due to the presence of modulating materials within the zones in the enclosure which materials decrease humidity in the stream; and passing the modified gas to an outlet of the vessel.

2. The method of claim 1 wherein the apparatus that rotates the enclosure is comprised of a motor and shaft extending from the motor which shaft extends from the top to the bottom of the enclosure and the shaft is pressure sealed from the enclosure.

3. The method of claim 2 wherein the shaft is sealed from the modulating zones and the environment surrounding the vessel using a seal.

4. The method of claim 3 wherein the seal is an H-shaped seal where two legs of the H are adjacent to the modulating zones and the other two legs of the H are adjacent to a seal adjacent to the shaft or an extension of the shaft.

5. An apparatus for conditioning a plurality of gas streams comprising a vessel which contains an enclosure capable of rotating therein, which enclosure is pressure sealed from the surrounding atmosphere and which is divided into a plurality of modulating zones;

the zones having the ability to modify the properties of the gas streams coming in contact with the zones due to the presence of modulating materials therein which material decreases humidity in the stream;

a motor within the vessel capable of rotating the enclosure within the vessel to facilitate the contacting of the gas streams within the zones; and an inlet to the vessel for the gas streams and an outlet from the vessel to pass the modulated gas streams from the vessel, whereby the gas streams pass through the inlet to the vessel and then to the enclosure and are modified in the zones as the enclosure is rotated and exits from the enclosure zones in a modified form and then exit from the vessel whereby the gas stream that exits the apparatus has a decreased humidity.

6. The apparatus of claim 5, whereby the motor has a shaft attached thereto and positioned such that the shaft extends therefrom into the enclosure, and wherein the shaft is sealed from the modulating zones and the environment surrounding the vessel using a seal.

7. The apparatus of claim 6, wherein the seal is an H-shaped seal where two legs of the H are adjacent to the modulating zones and the other two legs of the H are adjacent to a seal adjacent to the shaft or an extension of the shaft.

8. The apparatus of claim 5 wherein there are a plurality of inlets and a plurality of outlets to the vessel.

9. A method for conditioning a gas stream for a fuel cell apparatus by decreasing humidity therein comprising passing the gas stream into a vessel which vessel contains a rotating enclosure and which contains a motor to rotate the enclosure, which enclosure is pressure sealed from the surrounding atmosphere and which is divided into a plurality of modulating zones; treating the gas to modify its properties within the enclosures due to the presence of modulating materials within the zones in the enclosure which materials decrease humidity in the stream; and passing the modified gas to an outlet of the vessel to be utilized in the fuel cell apparatus.

10. An apparatus for conditioning a plurality of gas streams present in a fuel cell apparatus by decreasing humidity therein comprising an inlet for passing the gas stream into a vessel which vessel contains a rotating enclosure and which contains a motor to rotate the enclosure, which enclosure is pressure sealed from the surrounding atmosphere and which is divided into a plurality of modulating zones for treating the gas to modify its properties within the enclosure due to the presence of modulating materials within the zones in the enclosure which materials decrease humidity in the stream; and an outlet for passing the modified gas from the vessel to be utilized in the fuel cell apparatus.

* * * * *